United States Patent [19]

Matsuzaki

[11] Patent Number: 4,899,950
[45] Date of Patent: Feb. 13, 1990

[54] CASSETTE CASE FOR MAGNETIC TAPE AND THE LIKE FEATURING IMPROVED TAPE TENSION CONTROL ARRANGEMENT

[75] Inventor: Shuichi Matsuzaki, Miyagi, Japan

[73] Assignee: Sony Corporation, Tokyo, Japan

[21] Appl. No.: 180,814

[22] Filed: Apr. 12, 1988

[30] Foreign Application Priority Data

Apr. 24, 1987 [JP] Japan .................................. 62-101551

[51] Int. Cl.⁴ .......................................... G11B 23/084
[52] U.S. Cl. .................................... 242/198; 242/199
[58] Field of Search ................................. 242/197–200; 360/132

[56] References Cited

U.S. PATENT DOCUMENTS 3,797,779  3/1974  Esashi et al. ...................... 242/199
4,290,567  9/1981  Saito ................................. 242/199 X
4,463,918  8/1984  Takagi ............................... 360/132 X Primary Examiner—David Werner
Attorney, Agent, or Firm—Ronald P. Kananen

[57] ABSTRACT

In order to prevent a tension control pad from being excited to the point of undergoing resonance, an arrangement modifies the normal resonance frequency of the pad upon a given amount of tension being developed in the tape against which the pad is applied. In the disclosed embodiment, the provision takes the form of a projection which engages a resilient leaf spring-like member upon a predetermined amount of flexure occurring in a manner which stiffens the arrangement and elevates its resonance frequency.

14 Claims, 4 Drawing Sheets

CASSETTE CASE FOR MAGNETIC TAPE AND THE LIKE FEATURING IMPROVED TAPE TENSION CONTROL ARRANGEMENT

BACKGROUND OF THE INVENTION

1. Field of the Invention

The present invention relates generally to a magnetic tape cassette and more specifically to a cassette suited for use with VTR equipment and the like.

2. Description of the Prior Art

Examples of cassettes suitable for use in equipment such as a VTR decks and the like can be found in publications JM-A-51-38749, JM-A-51-41457 and JM-A-62-012103. These devices have included arrangements which are designed to prevent slack from developing in the tape continued therein.

However, these types of arrangements have suffered from the drawbacks that due to the nature of the tensioning arrangement (hereinafter referred to as a tension regulator) which is designed to prevent the development of tape slack, under cetain circumstances is subject to vibration which induces the pads in sliding contact with the tape to resonate and thus deteriorate the tension control of the tape to the point that detrimental effects on the reproduction of the data recorded on the tape occur.

More specifically, FIG. 1 shows a prior art type cassette disclosed in JM-A-62-12103. In this arrangement b denotes the lower half of a cassette case a. This half or shell is formed with two tape apertures c, c' respectively at the forward left and right hand sides thereof. The letter e denotes a magnetic tape which is wound on tape reels d and d' and which is arranged to pass out of the cassette through the previously mentioned tape apertures c, c' and span across the forward face of the device. The lower half b of the cassette is formed with integral tape guides g, g' and f, f' which guide the path of the tape e as it passes from the left reel a, (over guides g and f), out through tape opening c, across the forward end of the cassette, and in through tape aperture c' (over tape guides f' and g') to the right hand reel d'.

The letters h, h' denote resilient sheet like members which define what shall be referred to as tension control pads, which are attached to curved rib-like walls formed in the lower half b of the cassette. These elements form a vital part of a tape tension regulating arrangement. Smooth thin film sheets i and i' are fixed to the respective free ends of the pads h, h'.

As shown, these pads are arranged to slidingly contact the inner surface of the tape e and bias the latter toward and/or into contact with the tape guides g, g'. During non-use, the pads assume the positions illustrated in solid lines, while when the tape is drawn out (shown in phantom) and passed over the reading and recording heads of the VTR deck, a given level of tension is developed which flexes the pads h, h' and induces the latter to move at least partially toward the positions such as illustrated in phantom.

However, with this arrangement, especially as the tape e is wound from reel d to reel d', a large vibration movement particularly in the left hand pad h tends to be produced. Under these conditions, a tension control pin j which forms part of tension control arrangement included in the deck in which the cassette is loaded and which is intended to maintain a fixed level of tension in the tape, tends to be moved in the manner indicated by the arrows in FIG. 1. As a result of the back and forth movement of the tension control pin j, the vibration in pad h tends to be excited to its resonant frequency. The abnormally large movement off pad h due to this resonance tends to exert a highly undesirable influence on the uniformity of the running speed of the tape and cause "jitter" in the image being reproduced.

To overcome this problem, it was thought to increase the rigidity of the pad and thus modify the resonant frequency of the tension regulation arrangements. However, as it is necessary to allow the tape to be readily separated from the guide pins g, g', the degree to which the flexibility of the pads can be modified is limited. Accordingly, a solution to this problem has hitherto not been forthcoming.

SUMMARY OF THE INVENTION

It is an object of the present invention to provide a tension regulation arrangement for a tape cassette which obviates the resonance-induced tape speed variation encountered with the above disclosed type of prior art.

In brief, the above object is achieved by an arrangement wherein in order to prevent a tension control pad from being excited to the point of undergoing resonance, an arrangement modifies the normal resonant frequency of the pad upon a given amount of tension being developed in the tape against which the pad is applied. In the disclosed embodiment, the provision takes the form of a projection which engages a resilient leaf spring-like member upon a predetermined amount of flexure occuring in a manner which stiffens the arrangement and elevates its resonant frequency.

More specifically, a first aspect of the present invention comes in the form of a tape cassette which features: a reel; a tape wound on the reel; a device for controlling the tension in the tape; and an arrangement associated with the tension control device for preventing the device from being excited to its resonant frequency.

A further aspect of the invention comes in that the cassette includes first and second tape guide members, the first and second tape guide members being arranged between the reel and a opening through which the tape is fed out of the cassette, the first and second guide members being arranged so that the tape passes therebetween and slides on the same, and wherein the device for controlling the tension in the tape takes the form of a resilient member which slidingly contacts the tape, the resilient member biasing the tape in a manner wherein it tends to sandwich the tape between itself and the first tape guide.

A third aspect of the invention comes in that the resonance excitement-preventing arrangement takes the form of a projection, the projection being arranged to cooperate with the resilient member in a manner which limits the amount by which the resilient member can be distorted and the amount by which the tape can be moved away from the first tape guide member.

Another aspect of the present invention comes in that the resonance-excitement-preventing arrangement is defined by a part of the tension controlling device, the part being such as to cause the tension control device to have a resonant frequency which is higher than that which can be induced by fluctuations in the tension of the tape.

A fourth aspect of the present invention comes in the form of a system for reproducing a signal recorded on a tape, the system featuring: a cassette; a reel rotatably disposed in the cassette; a tape wound on the reel; a first device for controlling the tension in the tape, the first tension control device being disposed in the cassette; an arrangement associated with the first tension control device for preventing the first tension controlling device from being excited to its resonant frequency; means for receiving the cassette; means for reproducing a signal recorded on the tape, the means having a head over which the tape is passed; means for driving the tape in manner that it unwinds from the reel; a second tension control device, the second tension control device being disposed externally of the cassette and operatively associated with the cassette receiving means and tape drive means, the second tension control device cooperating with the first tension control device in a manner which appropriately tensions the tape for passage over the head of the signal reproducing means, the first and second tension control devices cooperating to prevent sudden fluctuations in tape speed.

A fifth aspect of the invention comes in that the system further includes a locking arrangement, the locking arrangement being arranged to engage the reel when the cassette is withdrawn from the cassette receiving means and prevent rotation of the reel.

BRIEF DESCRIPTION OF THE DRAWINGS

The merits and advantages of the present invention will become more clearly appreciated as a detailed description of the preferred embodiment is made with reference to the appended drawings in which.

DETAILED DESCRIPTION OF THE PREFERRED EMBODIMENTS

Cassette Case

Figure 1:
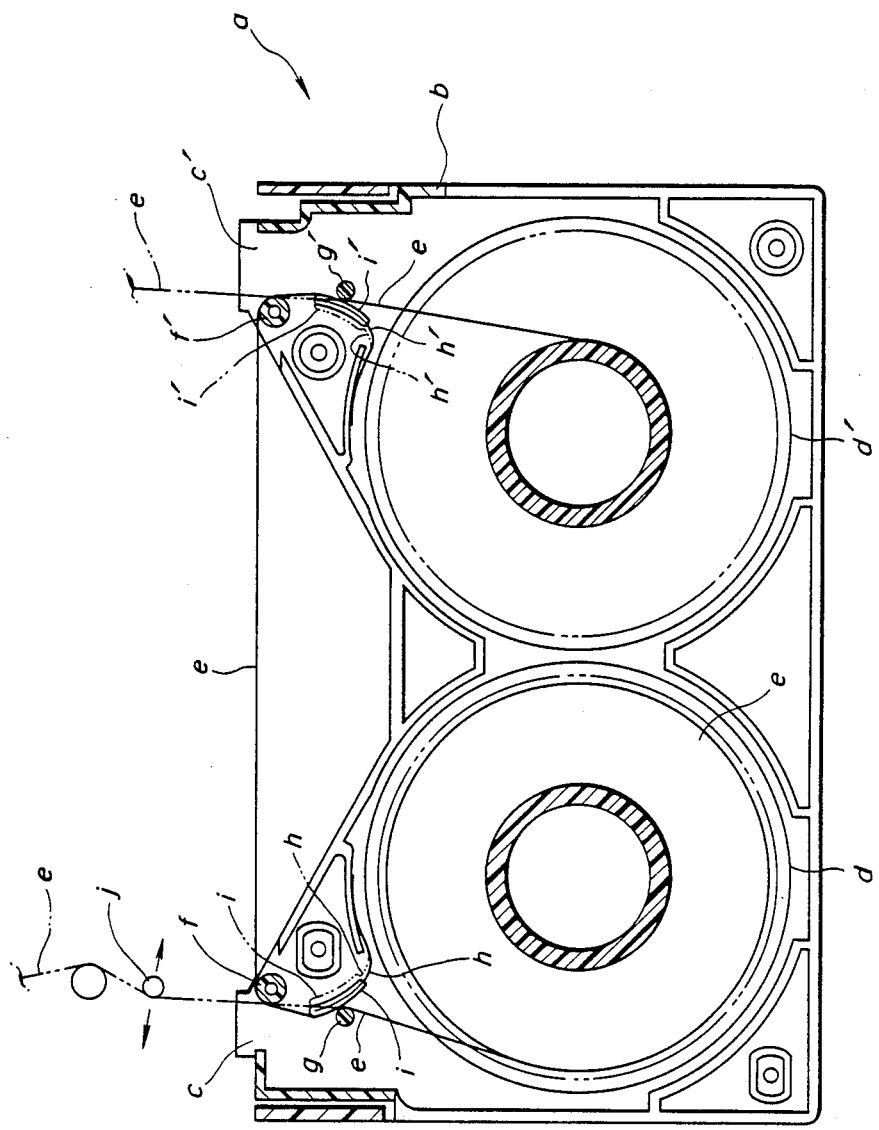
FIG. 1 is a plan view of a lower half of the prior art cassette discussed in some detail in the opening paragraphs of the instant disclosure.
Figure 2:
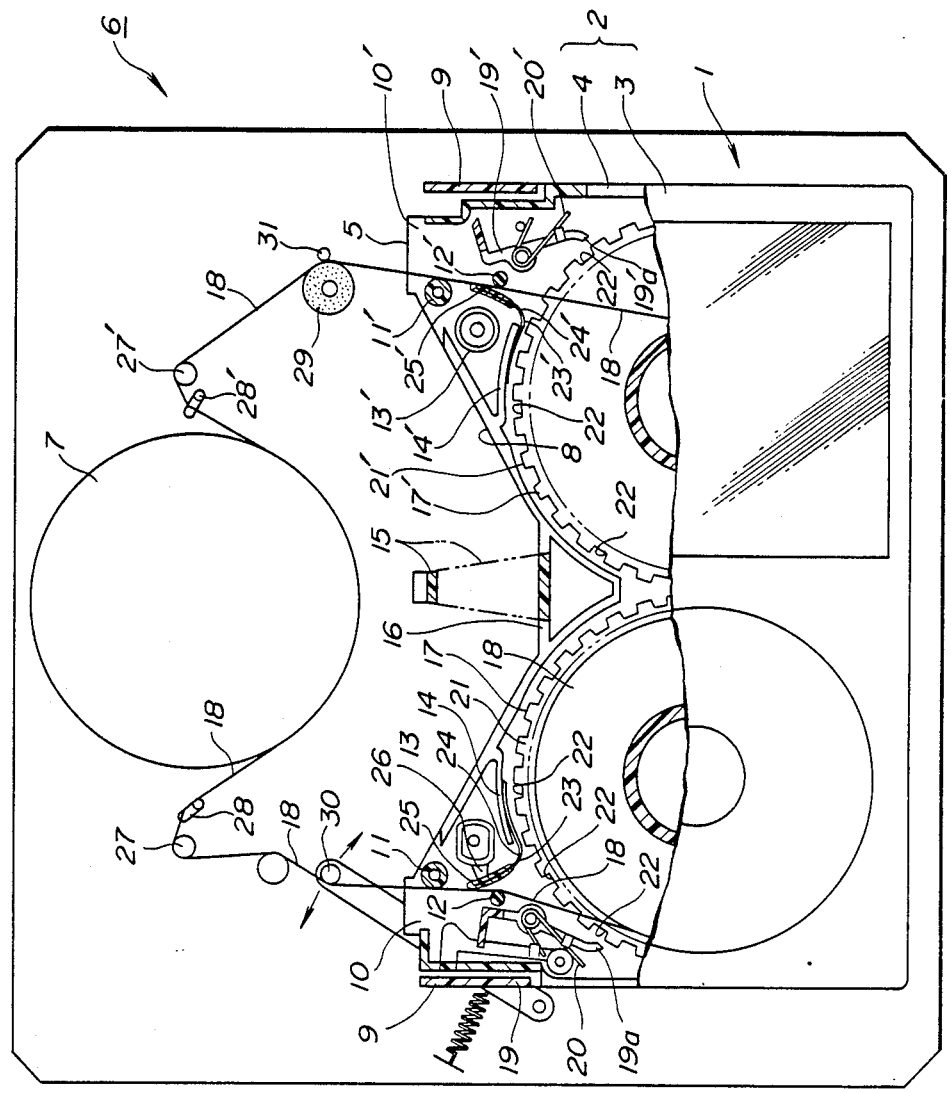
FIG. 2 is a plan view showing an embodiment of the present invention loaded into a cassette deck with the magnetic tape withdrawn from the cassette and arranged in an operaive configuration with respect to the head arrangement of the deck.
Figure 3:
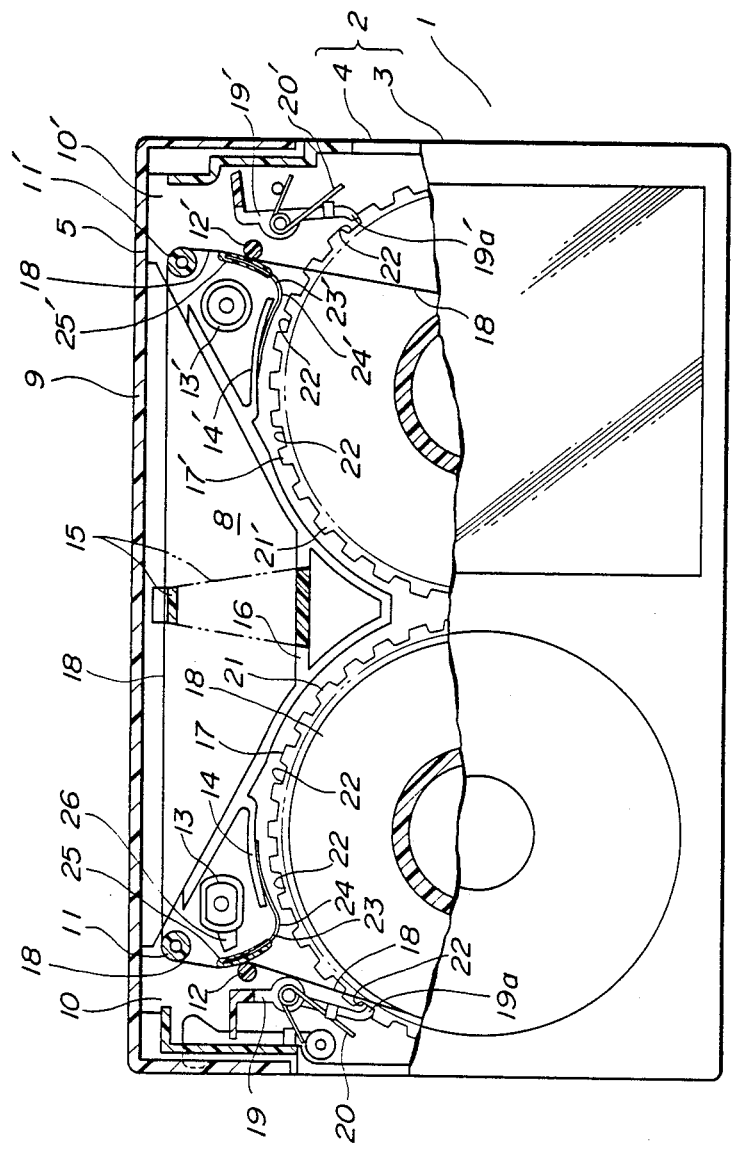
FIG. 3 is a plan view similar to that shown in FIG. 2 but which shows the cassette in a non-operative state.
Figure 4:
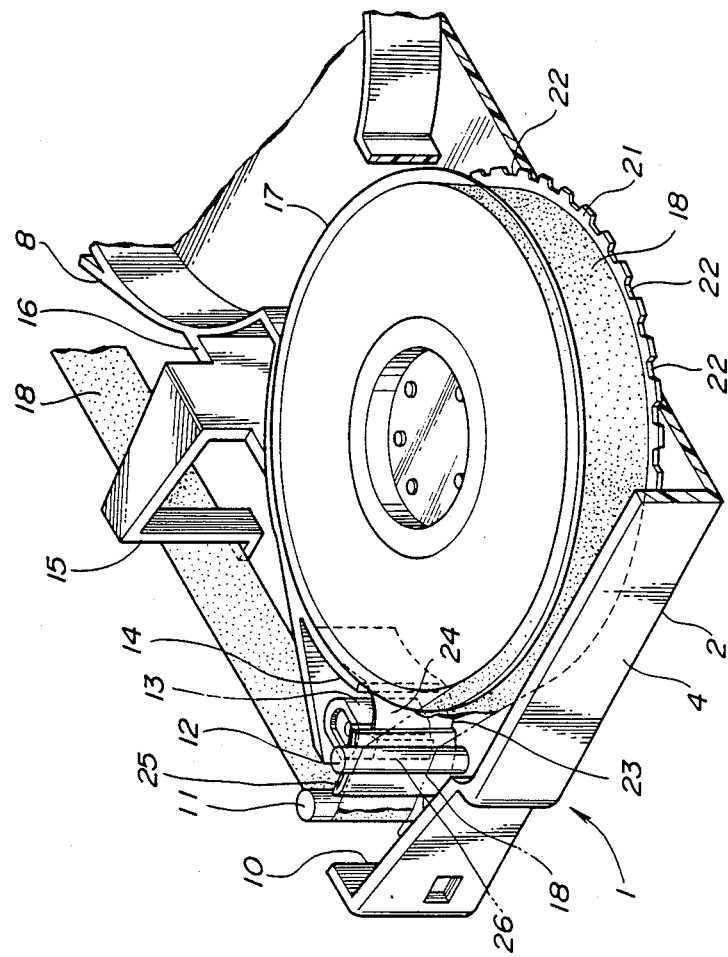
FIG. 4 is a perspective view of a forward corner of the cassette shown in the preceeding two figures which shows the constructional features which characterize the present invention.

FIGS. 2 to 4 show an embodiment of the present invention. In these figures, the numeral 1 denotes a tape cassette. This device includes a casing 2 comprised of upper and lower halves 3 and 4 which are detachably secured together by screws. In FIGS. 2 and 3, a portion of the upper half 3 is shown cut-away so as to reveal the construction which characterizes the present invention.

The numeral 5 denotes the forward edge of the cassette which, in FIG. 2, is shown in a fully loaded position within a VTR deck 6. This device includes a head drum 7 which is located proximate a recess 8 formed in the forward edge 5 which defines a section of the cassette which facilitates the withdrawal of the magnetic tape during the initial stages of loading.

The numeral 9 denotes a cover which is pivotally mounted at the front of the cassette. When the cassette is not in use, the cover pivots under the bias of a spring arrangement (not shown) to enclose the front of the cassette such as is shown in FIG. 3. On the other hand, when the cassette is loaded into a deck, the cover is pivoted upwardly to an open position by a non-illustrated mechanism, thus exposing the recess 8 and facilitating the withdrawal of the tape.

The numerals 10 and 10' denote the tape apertures which are respectively formed at the front left and right hand corners of the cassette 1 and through which the magnetic tape 18 passes. As will be understood the tape apertures 10, 10' are defined by mating recesses formed in the forward corners of the upper and lower halves 3 and 4. The numerals 11 and 11' denote tape guides which are formed integrally with the lower half 4 and which are respectively located proximate the tape apertures 10, 10'.

The numerals 12 and 12' denote tape guides which are located inboard of the tape guides 11, 11' located in the tape apertures 10, 10'. Located at a level approximately mid-way between the tape guides 11, 11' 12 and 12' are bosses 13, 13' in which threaded bores (no numeral) are formed and into which screws are received when the upper and lower halves are secured together.

The numerals 14 and 14' denote slightly curved wall portions which are formed integrally with the lower half 4 and which extend from inboard locations toward the sides of the lower half 4. The numeral 15 denotes a projection which extends from a central forward wall portion 16 and which has an essentially inversed L shape.

Tape reels and Magnetic Tape

The numerals 17 and 17' denote a pair of tape reels which are rotatably disposed in the cassette on the left and right of the center of the unit and on which the magnetic tape 18 is wound. For the sake of explanation a convention will be used wherein the left hand reel will be referred to as the S reel and the right hand reel referred to as the T reel. Viz., supply reel and take up reel.

During non-use, magnetic tape is arranged to pass from the S reel over the tape guides 12 and 11, pass out through the tape aperture 10 and span directly across the forward recess 8 of the cassette, to the tape guide 11' to pass in through the tape aperture 10' and pass to the T reel via the inboard tape guide 12'. In this condition, the projection 15 serves to protect the tape from damage such as is apt to occur if the tape 18 were to be pulled accidentally back into the recess 8 in a manner which brings the tape into contact with the relatively sharp edges defined at the inboard edges of the tape apertures 10, 10'.

Reel Stopper

During non-use periods, the S and T reels are prevented from rotation by the provision of stoppers 19 and 19'. These devices are pivotally mounted in the forward left and right hand corners of the lower half 4 and on the outboard side of the tape 18. The elongate members are pivotally mounted at locations proximate their mid points and are biased by springs 20 to rotate in a manner which brings pawl portions 19a, 19a' formed thereon into engagement with the lower flanges 21, 21' of each of the S and T reels. As shown in FIG. 3, each of these flanges 21, 21' is formed with crenulations about their peripheries which define locations in which the pawl members 19a, 19a' can be received and lock the reels against rotation.

When the cassette 1 is loaded into a deck 6, the locking members 19, 19' are biased to rotate against the springs 20, 20' to assume the positions shown in FIG. 2 by a cam arrangement (no numeral).

Tension control pads

The numerals 23 and 23' denote tension control pads which are arranged to control the tension in the magnetic tape 18. In this embodiment the pads are formed of sheets or strips 24, 24' which act like leaf springs. The sheets 24, 24 can be made of polyester or polyethylene terephthalate or a like material which exhibits desirable springy/resilient properties.

The strips 24, 24' defining the tension control pads 23 and 23' are secured to internal wall portions 14, 14' of the lower half 4 of the cassette case 2. As shown, these wall portions proximate the periphery of the tape reels 17, 17' and exhibits essentially the same curvature.

In order to reduced friction annd abrasion between the tape and the pads, protective sheets 25, 25' are secured to the free ends of the strips 24, 24'. These protective elements can be formed of Nylon (trade name) or any other similar type of material which exhibit sutiable low abrasive and frictional characteristics and which can be secured to the ends of the strips 24, 24.

As shown, the tension control pads 23, 23' function to press the magnetic tape which is stretched between the tape guides 11, 11' and 12, 12', toward and/or against the inboard guides 12, 12' in a manner which tends to pull the tape down on the outer guides 11, 11'.

With this arrangement, the appropriate tension tends to be developed and maintained in the magnetic tape 18 when the tension control pads 13, 13' assume the positiions illustrated in FIG. 3.

When the cassette is not in use, a suitable amount of tension is maintained in the tape 18 in a manner which prevents movement of the tape and which applies a traction force on the reels 17, 17'. This latter mentioned traction in combination with the reel stopper arrangements 19, 19' disclosed hereinbefore, hold the reels 17, 17' in placed and prevents a rattling noise and prevents the tape from being undesirably paid out of the cassette.

It should be noted that in the event that the material from which the elements 23, 23' are made exhibits sufficiently good non-abrasive characteristics then the protective Nylon sheets 25, 25' can be omitted.

Resonance suppressing construction

The lower half 4 of the cassette is formed with two bosses 13 and 13' as previously mentioned. In accordance with the instant embodiment, a resonance suppressing projection 26 is formed on the left hand boss 13 which is located proximate the S reel. As shown, this projection is arranged to extend toward the left hand tension control pad 23. The projection is dimensioned so as to juxtapose the pad 23 when the pad is sandwiching the tape 18 against the tape guide 12 and limit the distance through which the pad can be moved away from the tape guide 12 in the direction of the boss 13.

In this embodiment, the projection 26 is formed integrally with the boss 13 and thus is defined by the same material as from which the lower half 4 of the cassette is formed.

Tape loading and playing

When the cassette is loaded into the VTR deck 6, the cover 9 is swung up and out to expose the tape 18. At the same time, the reel stoppers 19, 19' are cammed to the positions illustrated in FIG. 2. This of course releases the reels 17, 17' and enables the same to be rotated. Following this, the tape is tracked out of the cassette and moved into the illustrated arrangement with the tape loading posts 27, 27', 28, 28', the pinch roller 29 and the tension regulation pin 30 and thus assume a working position against the tape head 7.

When the command to reproduce is issued, the tape 18 is driven at a predetermined speed by rotation of a capstan 31 which is arranged to sandwich the magnetic tape 18 between it and the pinch roller 29.

Accordingly, tape is drawn off the S reel and taken up by the T reel. During this process, a backtension tends to be developed in the tape due to the various friction and inertia which tends to produce a braking effect. This tends to increase the tension in the section of tape which is stretched between the tape guides 11 and 12 and biases the left hand tension control pad 23 back toward the boss 13 to a greater degree than the right hand pad 23' is biased toward tape guide 12'. This marks what normally is the beginning of the resonance phenomenon disclosed hereinbefore.

Resonance Suppression Mechanism

With the instant embodiment, when the tension in the tape 18 increases in the above manner, the tension pad 23 is moved into contact with the projection 26.

Upon abutment with the projection 26, the pad 23 is restricted from undergoing any further movement irrespective of any further increase in tension and thus is subject to a marked change in resonance characteristics. Accordingly, the movement of the tension control device of the deck 6 is prevented from exciting relatively large vibrational movements of the pad 23 which lead to the resonance problem. Viz., the fluctuations in the tape tension which are induced by the oscillating movement of the tension control pin in the illustrated view in FIG. 2 is unable to produce a vibration which influences the pad 23 in a manner which leads to the establishment of a vibration the frequency of which corresponds to the resonance frequency of the pad.

With the above disclosed embodiment, since the projection 26 is formed integrally with the lower half of the cassette, it is possible to achieve highly accurate dimensional control over the member and thus ensure easy production and quality control.

Alternative embodiments

It will be noted that although the above disclosure has been given with respect to a projection which is integrally formed with a boss of the lower half of the cassette, the invention is not so limited and encompasses many and varied arrangements which will produce the same effect.

For example, it is possible to produce an element having the projection and fit this into place in the cassette in a suitable manner.

It is also within the scope of the present invention to omit the projection and form the pad 23 in a manner that it has a resonance frequency which sufficiently high as to obviate the problem discussed hereinbefore. The shape and point of connection of the pad is variable. Basically the only requirement other than applying tension and in the desired manner is that it permits the tape 18 to slide smoothly thereover in a manner which prevents abrasion and the like. By way of example only, it is possible to form two leaf-spring like elements, the first contacting the tape while the second is spaced from the first leaf and contacted thereby after the first leaf has been deflected through a predetermined distance.

Further, it will be noted that the shape of the elements used in combination with the tension control pad 23 are not limited to those illustrated in the instant embodiment. It is possible to use tape guide which do not have a circular cross-section and/or those which are defined by suitably shaped wall portions of the cassette. For example, those which serve to improve the rigidity and/or serve to provide some other supporting or connection function.

Those skilled in the art will recognize that many changes can be made in the design and configuration of the cassette without departing from the principles of the invention set out in the appended claims.

What is claimed is:

1. In a tape cassette
a reel;
tape wound on said reel;
a device for controlling the tension in said tapel; and
an arrangement associated with said tension control device for preventing said device from being excited to its resonant frequency;
said resonance-excitement-preventing arrangement takes the form of a projection, said projection being arranged to cooperate with said device in a manner which limits the amount by which said tension controlling device can be distorted and the amount by which said tape can be moved away from a first tape guide member upon which said tape slides, and said projection extends from a structural member which forms part of said cassette, said structural member being formed integrally with said cassette.

2. In a tape cassette
a reel;
tape wound on said reel;
a device for controlling the tension in said tape; and
an arrangement spaced from said tension control device so as to cause said device to have a resonant frequency which is higher than that which can be induced by fluctuations in the tension of said tape.

3. In a tape cassette
a reel;
tape wound on said reel;
a device for controlling the tension in said tape; and
an arrangement associated with said tension control device for preventing said device from being excited to its resonant frequency;
said cassette includes first and second tape guide members, said first and second tape guide members being arranged between said reel and a opening throug which said tape is fed out of said cassette, said first and second guide members being arranged so that said tape passes therebetween and slides on the same, and wherein said device for controlling said tension in said tape takes the form of a resilient member which slidingly contacts tape, said resilient member biasing said tape in a manner wherein it tends to sandwhich said tape between itself and the first tape guide,
said resonance excitement preventing arrangement takes the form of a projection, said projection being arranged to cooperate with said resilient member in manner which limits the amount by which the resilient member can be distorted and the amount by which the tape can be moved away from said first tape guide member; and,
said projection extends from a structural member which forms part of said cassette, said structural member being formed integrally with said cassette.

4. A tape cassette as claimed in claim 3 wherein said structural member takes the form of a boss, said boss being arranged to receive a member which secures first and second halves of said cassette together.

5. In a tape cassette
a reel;
tape wound on said reel;
a device for controlling the tension in said tape; and
an arrangement associated with said tension control device for preventing said device from being excited to its resonant frequency;
said cassette includes first and second tape guide members, said first and second tape guide members being arranged between said feel and an opening through which said tape is fed out of said cassette, said first and second guide members being arranged so that said tape passes therebetween and is slidable on the same, said device for controlling said tension in said tape takes the form of a resilient member which slidably contacts said tape, said resilient member biasing said tape in a manner wherein it tends to sandwich said tape between itself and said first tape guide;
said resonance-excitement-preventing arrangement takes the form of a projection, said projection being arranged to cooperate with said resilient member in a manner which limits distortion of the resilient member and the amount by which said tape can be move away from said first tape guide member,
said resonance excitement preventing arrangement is defined by a part of said tension controlling device, said part being such as to cause the tension control device to have resonant frequency which is higher than that which can be induced by fluctuations in the tension of said tape.

6. A tape cassette as claimed in claim 5 further comprising a locking arrangement, said locking arrangement being arranged to engage said reel when said cassette is not in use and prevennt rotation of said reel.

7. A tape cassette as claimed in claim 6 wherein said reel includes a flange, said flange having crenulations about the periphery thereof, said crenulations cooperating with said locking arrangement to prevent rotation of said reel within said cassette.

8. A tape cassette as claimed in claim 6 further comprising cam means for moving said locking arrangement to an unlocked position when said cassette is loaded into an apparatus which reproduces signals stored on said tape.

9. In a tape cassette
a reel;
tape wound on said reel;
means for controlling the tension in said tape; and
means associated with said tension control device for preventing said device from being excited to its resonant frequency;
said resonance preventing means causes said tension control means to exhibit more than one resonant frequency.

10. A tape casssette as claimed in claim 9 wherein said said tension controlling means is movable in response to an increase in the tension in said tape, and wherein said resonance preventing means increases the resonant frequency of the tension controlling means upon a predetermined amount of movement of said tension controlling means.

11. In a system for reproducing a signal recorded on a tape;
- a cassette;
- a reel rotatably disposed in said cassette;
- a tape wound on said reel;
- a first device for controlling the tension in said tape, said first tension control device being disposed in said cassette;
- an arrangement associated with said first tension control device for preventing said first tension controlling device from being excited to its resonant frequency;
- means for receiving said cassette;
- means for reproducing a signal recorded on said tape, said means having a head over which the tape is passed;
- means for driving said tape in a manner that it unwinds from said reel;
- a second tension control device, said second tension control device being disposed externally of said cassette and operatively associated with said cassette receiving means and tape drive means, said second tension control device cooperating with said first tension control device in a manner which appropriately tensions the tape for passage over the head of said signal reproducing means, said first and second tension control devices cooperating to prevent sudden fluctuations in tape speed;
- first tension control device takes the form of a resilient leaf spring-like member which is fixed at one end to a structure of said cassette and which has a free end which is adapted to slide smoothly on the tape and to bias said tape toward a first tape guide formed in said cassette; and,
- a projection, said projection being arranged in said cassette in a manner to juxtapose the leaf spring-like member and to limit the amount by which it can flex under an increase in the tension in said tape, said projection defining said arrangement which prevents said first tension control device from being excited to its resonant frequency, said projection extends from a structural member which forms part of said cassette, said structural member being formed integrally with said cassette.

12. A system as claimed in claim 11 further comprising a locking arrangement, said locking arrangement being arranged to engage said reel when said cassette is withdrawn from said cassette receiving means and prevent rotation of said reel.

13. A system as claimed in claim 12 wherein said reel includes a flange, said flange having crenulations about the peripheery thereof, said crenulations cooperating with said locking arrangement to prevent rotation of said reel within said cassette.

14. A tape cassette as claimed in claim 13 further comprising cam means for moving said locking arrangement to an unlocked position when said cassette is loaded into said cassette receiving means.

* * * * *